(12) United States Patent
Gupta et al.

(10) Patent No.: US 9,294,213 B2
(45) Date of Patent: Mar. 22, 2016

(54) PACKET DATA NETWORK CONNECTIONS FOR MULTI PRIORITY WIRELESS DEVICES

(71) Applicant: INTEL CORPORATION, Santa Clara, CA (US)

(72) Inventors: Vivek Gupta, San Jose, CA (US); Puneet K. Jain, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 199 days.

(21) Appl. No.: 13/729,568

(22) Filed: Dec. 28, 2012

(65) Prior Publication Data

US 2013/0301547 A1 Nov. 14, 2013

Related U.S. Application Data

(60) Provisional application No. 61/646,223, filed on May 11, 2012.

(51) Int. Cl.
*H04W 28/10* (2009.01)
*H04J 3/16* (2006.01)
(Continued)

(52) U.S. Cl.
CPC ............... *H04J 3/1694* (2013.01); *H04B 1/56* (2013.01); *H04B 7/024* (2013.01); *H04B 7/0456* (2013.01);
(Continued)

(58) Field of Classification Search
CPC ............ H04J 3/1694; H04J 3/26; H04J 3/00; H04W 72/10; H04W 72/0426; H04W 76/023; H04W 4/023; H04W 52/0225; H04W 24/02; H04W 4/005; H04W 48/20; H04W 4/06; H04W 76/048; H04W 76/027; H04W 36/00; H04W 72/0413; H04W 52/0235; H04W 72/042; H04W 4/22; H04W 52/0212; H04W 56/00; H04L 27/2627; H04L 69/22; H04L 29/02; H04B 7/0486; H04B 7/065; H04B 7/0473; H04B 7/063; H04B 7/0647; H04B 7/0639; H04B 7/024; H04B 7/0456; H04B 7/0632; H04B 1/56
USPC .......................................................... 370/329
See application file for complete search history.

(56) References Cited

U.S. PATENT DOCUMENTS

2008/0130653 A1   6/2008  Chen et al.
2011/0171953 A1   7/2011  Faccin et al.
(Continued)

FOREIGN PATENT DOCUMENTS

EP    2369883 A1    9/2011
EP    2369886 A1    9/2011
(Continued)

OTHER PUBLICATIONS

International Search Report and Written Opinion received for PCT Patent Application No. PCT/US2013/040649, mailed on Aug. 23, 2013, 14 pages.
(Continued)

*Primary Examiner* — Jay P Patel
(74) *Attorney, Agent, or Firm* — Thorpe North & Western LLP

(57) ABSTRACT

A device and method for forming a packet data network (PDN) connection at a dual access priority mode configured user equipment (UE) is disclosed. The method comprises sending, from the UE to a mobility management entity (MME), a PDN connectivity request message that includes a NAS signaling priority override indicator to indicate that the PDN connection has a different NAS signaling priority mode than an existing PDN connection. The existing PDN connection is operating in a first signaling priority mode. The existing PDN connection is deactivated at the UE. A new PDN connection, operating in a second NAS signaling priority mode, is established at the UE.

24 Claims, 5 Drawing Sheets

(51) Int. Cl.

| | | |
|---|---|---|
| *H04B 7/26* | (2006.01) | |
| *H04W 36/00* | (2009.01) | |
| *H04W 24/10* | (2009.01) | |
| *H04W 72/04* | (2009.01) | |
| *H04W 72/08* | (2009.01) | |
| *H04J 3/00* | (2006.01) | |
| *H04B 1/56* | (2006.01) | |
| *H04W 56/00* | (2009.01) | |
| *H04W 52/02* | (2009.01) | |
| *H04W 76/02* | (2009.01) | |
| *H04W 4/22* | (2009.01) | |
| *H04W 36/22* | (2009.01) | |
| *H04B 15/00* | (2006.01) | |
| *H04W 76/04* | (2009.01) | |
| *H04B 7/02* | (2006.01) | |
| *H04B 7/04* | (2006.01) | |
| *H04B 7/06* | (2006.01) | |
| *H04W 24/02* | (2009.01) | |
| *H04W 72/12* | (2009.01) | |
| *H04L 29/02* | (2006.01) | |
| *H04W 4/00* | (2009.01) | |
| *H04W 4/06* | (2009.01) | |
| *H04W 48/20* | (2009.01) | |
| *H04L 29/06* | (2006.01) | |
| *H04W 4/02* | (2009.01) | |
| *H04J 3/26* | (2006.01) | |
| *H04L 27/26* | (2006.01) | |
| *H04W 72/10* | (2009.01) | |
| *H04W 36/30* | (2009.01) | |
| *H04W 36/18* | (2009.01) | |
| *H04W 88/06* | (2009.01) | |
| *H04W 72/02* | (2009.01) | |
| *H04W 16/14* | (2009.01) | |

(52) U.S. Cl.
CPC .......... *H04B 7/0473* (2013.01); *H04B 7/0486* (2013.01); *H04B 7/063* (2013.01); *H04B 7/065* (2013.01); *H04B 7/0632* (2013.01); *H04B 7/0639* (2013.01); *H04B 7/0647* (2013.01); *H04B 7/26* (2013.01); *H04B 15/00* (2013.01); *H04J 3/00* (2013.01); *H04J 3/26* (2013.01); *H04L 27/2627* (2013.01); *H04L 29/02* (2013.01); *H04L 69/22* (2013.01); *H04W 4/005* (2013.01); *H04W 4/023* (2013.01); *H04W 4/06* (2013.01); *H04W 4/22* (2013.01); *H04W 24/02* (2013.01); *H04W 24/10* (2013.01); *H04W 36/00* (2013.01); *H04W 36/0061* (2013.01); *H04W 36/22* (2013.01); *H04W 48/20* (2013.01); *H04W 52/0212* (2013.01); *H04W 52/0225* (2013.01); *H04W 52/0235* (2013.01); *H04W 56/00* (2013.01); *H04W 72/042* (2013.01); *H04W 72/0413* (2013.01); *H04W 72/0426* (2013.01); *H04W 72/082* (2013.01); *H04W 72/085* (2013.01); *H04W 72/10* (2013.01); *H04W 72/1215* (2013.01); *H04W 76/023* (2013.01); *H04W 76/027* (2013.01); *H04W 76/048* (2013.01); *H04W 16/14* (2013.01); *H04W 36/18* (2013.01); *H04W 36/30* (2013.01); *H04W 72/02* (2013.01); *H04W 88/06* (2013.01); *Y02B 60/50* (2013.01)

(56) References Cited

U.S. PATENT DOCUMENTS

| | | |
|---|---|---|
| 2012/0082029 A1 | 4/2012 | Liao |
| 2013/0155954 A1 | 6/2013 | Wang et al. |
| 2013/0182644 A1 | 7/2013 | Kim et al. |
| 2013/0201870 A1* | 8/2013 | Gupta .......................... 370/254 |
| 2013/0233399 A1 | 9/2013 | Choe |
| 2013/0336218 A1 | 12/2013 | Gupta |

FOREIGN PATENT DOCUMENTS

| | | |
|---|---|---|
| EP | 2440002 A2 | 4/2012 |
| EP | 2448345 A2 | 5/2012 |
| WO | WO 2012/052071 | 4/2012 |
| WO | WO 2013/119583 A1 | 8/2013 |

OTHER PUBLICATIONS

Non-Access-Stratum (NAS) protocol for Evolved Packet System (EPS), Stage 3 (Release 10), 3rd Generation Partnership project; Technical Specification Group Core Network and Terminals, See sections 4.2, 6.5.1, 6.5.3, 6.5.4, and 8.3.20. Published Mar. 2012. 299 pages.

Mobile radio interface Layer 3 specification; Core Network protocols; stage 3 (release 10) 3rd Generation Partnership project; Technical Specification Group Core Network and Terminals. Published Sep. 2011. 616 pages.

3GPP TS 24.008, "Mobile Radio Interface Layer 3 Specification", Core Network Protocols, Mar. 2012, pp. 659, Release 11, Version 11.2.1, Valbonne, France.

3GPP TS 24.301, "Non-Access-Stratum (NAS) Protocol for Evolved Packet System (EPS)", Mar. 2012, pp. 327, Stage 3, Release 10, V 10.6.1, Valbonne, France.

3GPP TS 24.301, "Non-Access-Stratum (NAS) Protocol for Evolved Packet System (EPS)", Mar. 2012, pp. 327, Stage 3, Release 11, V 11.2.1, Valbonne, France.

3GPP TS 24.368, "Non-Access Stratum (NAS) Configuration", Management Object (MO), Sep. 2011, pp. 13, Release 11, Version 11.0.0, Valbonne, France.

Huawei, "About Dual-Priority UEs", 3GPP TSG SA WG2 TD S2-121276, Apr. 2012, pp. 4, Meeting 90, Agenda 4.1, Bratislava, Slovakia.

Huawei, "Discussion on Implementing Dual Access Priority", 3GPP TSG CT WG1 C1-122081, May 2012, pp. 5, Meeting 78, Agenda 11.7.7, Kyoto, Japan.

Nokia et al, "Dual Priority", 3GPP TSG SA WG2 TD S2-121565, Apr. 2012, pp. 3, Meeting 90, Agenda 4.1, 7.1.2, Bratislava, Slovakia.

Office Action for Belgium application 201300332 dated Mar. 31, 2015, 17 pages.

Office Action for Chinese application 201310304056.1 dated Oct. 15, 2015, 304 pages including English Translation.

Office Action for Netherland application NL2010784 dated Mar. 31, 2015, 14 pages including English Translation.

Office Action for Spanish application 201330676 dated May 6, 2015, 10 pages including English Translation.

Office Action for Swedish application 1350582-1 dated May 30, 2014, 8 pages.

Qualcomm Incorporated, "Discussion on Dual Priority Devices and CT1 Issues", SA WG2 S2-121517, Apr. 2012, pp. 3, Meeting 90, Agenda 4.1, Bratislava, Slovakia.

SA WG2, "Reply LS on M2M Dual Priority", 3GPP TSG CT WG4 C4-121019, May 2012, pp. 3, Meeting 57, Kyoto, Japan.

Search Report for Spanish application 201330676 dated Jul. 14, 2014, 344 pages.

Search Report for Spanish application 201330676 dated Jul. 14, 2014, 344 pages including English Translation.

Search Report for Taiwan application 120115689 dated Nov. 17, 2014, 3 pages including English Translation.

Vodafone, "CT1 Impacts and Open Issues of Introducing Dual Priority Service", 3GPP TSG CT WG1 C1-120145, Feb. 2012, pp. 3, Meeting 76, Agenda 11.12 (SIMTC), Xiamen, China.

ZTE, "Proposals for Handling Dual Priority Issues", 3GPP TSG SA WG2 TD S2-121346, Apr. 2012, pp. 5, Meeting 90, Agenda 4.1, Bratislava, Slovakia.

\* cited by examiner

| 8 7 6 5 | 4 → 3 | 2 | 1 | |
|---|---|---|---|---|
| Device properties IEI | 0 Spare | Priority Override | Low priority | octet 1 |

FIG. 3a

```
Low priority (octet 1)

Bit
1
0        MS is not configured for NAS signalling low priority
1        MS is configured for NAS signalling low priority The value "0" can also be used by an MS configured for NAS
signalling low priority for the exception cases specified in sub
clause 1.8.

2
0        Low Priority is not overridden
1        Low Priority is overridden with normal priority Bits 3 and 4 of octet 1 are spare and shall be coded as zero.
```

FIG. 3b

PACKET DATA NETWORK CONNECTIONS FOR MULTI PRIORITY WIRELESS DEVICES

RELATED APPLICATIONS

This application claims the benefit of and hereby incorporates by reference U.S. Provisional Patent Application Ser. No. 61/646,223, filed May 11, 2012, with a docket number P45300Z.

BACKGROUND

Machine-to machine (M2M) wireless machines or devices (hereafter referred to as M2M devices) can communicate primarily or exclusively with other M2M devices, with little or no human intervention. Examples of M2M devices can include wireless sensors, meters to track vehicles of a fleet or measure the use of utilities such as electricity or gas, and so forth. In many cases, these M2M devices can connect to a wireless network and communicate with a network server via a wireless wide area network. For example, M2M devices may be used with the Institute of Electronics and Electrical Engineer (IEEE) 802.16 standard, IEEE Std. 802.16-2009, published May 29, 2009 (WiMAX), as well as in Third Generation Partnership Project (3GPP) networks. In parlance of the 3GPP Long Term Evolution ("LTE") Release 10 (March 2011) (the "LTE Standard"), M2M communications may alternatively be referred to as "machine-type communications (MTC).

From a network perspective, M2M communications can be considered to be relatively low-priority communications due to the tolerance of M2M devices for relatively high latency and infrequent data transfers. For instance, utility sensors may send a report, comprising a few bits, at a frequency of once per day. The delivery time window of the report may be considered acceptable within a period of several minutes to several hours. The high latency and infrequent communication enables network carriers to provide access for M2M devices to their networks for relatively low cost compared with typical low latency, higher bandwidth users.

However, many types of M2M devices that normally communicate on a low priority level may have rare occasions when they need to communicate on a priority level that is higher than a low priority.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 3a provides an example table illustrating a device properties information element (IE) in accordance with an embodiment of the present invention;

FIG. 3b provides an example table providing additional information for the device properties IE in accordance with an embodiment of the present invention;

Figure 1:
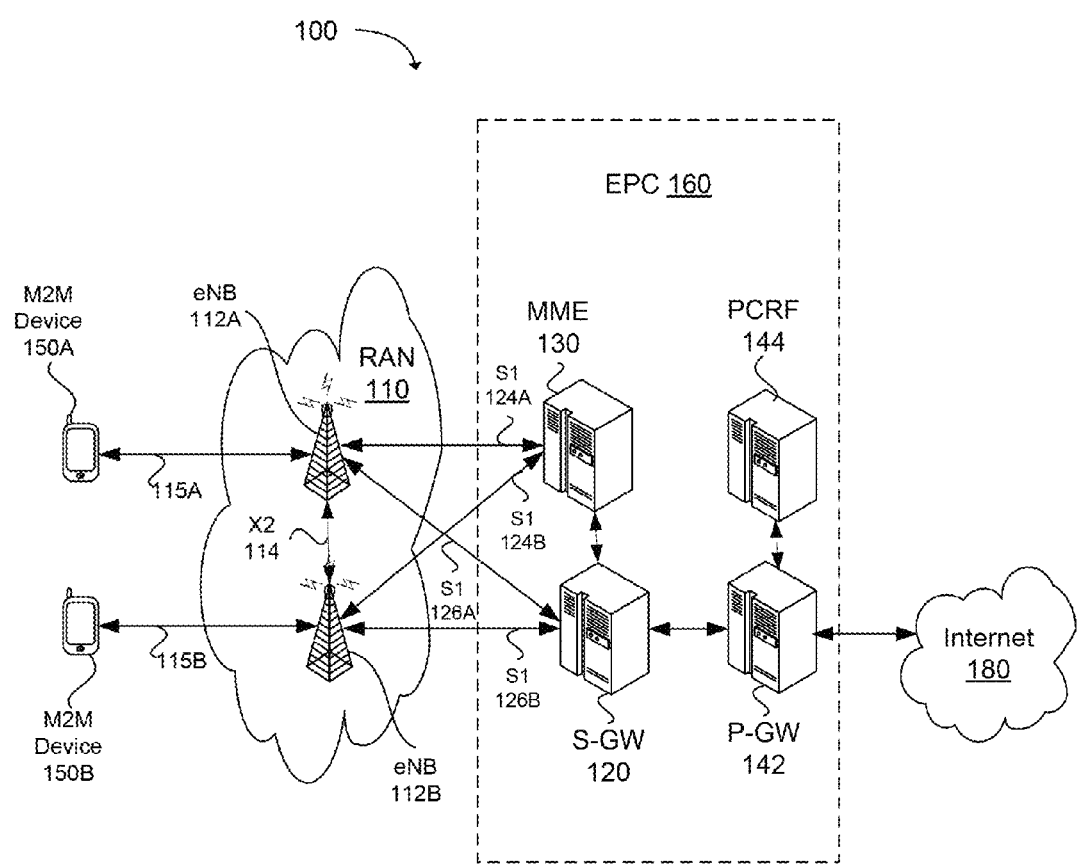
FIG. 1 illustrates a block diagram of a third generation partnership project (3GPP) wireless network.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Other terms may be defined elsewhere in the body of this specification.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

Techniques described herein provide for enabling user equipment (UE) such as an M2M device to provide at least two priority levels (i.e. dual priority) for communications initiated by the UE in a wireless network environment. In some wireless network environments, the M2M network overload control work can be configured to restrict M2M devices to a single priority level for all applications executing on the M2M device. The M2M device can be assigned a priority level of either "low priority" or "normal priority". In practice, a significant number of machine type communications by M2M devices may be categorized as "low priority". Accordingly, the M2M devices can be assigned to communicate with a low priority setting.

However, most M2M devices that normally use a "low priority" communication setting may also have infrequent occasions when the M2M device needs to communicate in a timely manner, with relatively low latency. For example, sensors on a roadway may be used to send weather conditions, such as precipitation and/or temperature information. The information may typically be sent with a low priority and high latency. During a winter storm, however, it may be desirable for a roadway sensor to send information about freezing temperatures or snow buildup in a timely manner. To accomplish this, the M2M device can switch from the low priority setting to use a higher priority communication setting, such as a "normal" priority setting. The higher priority communication setting can allow for communicate with relatively low latency relative to communication with the low priority setting.

In another example, an M2M device may host multiple applications. For example, a home automation control module can include a room temperature application that transmits data using a low priority, and a video-streaming application residing on the same device may transmit data using a "normal priority". The embodiments described herein are not limited to the above examples; the above examples are included for illustration of the techniques described in the present disclosure.

In order to enable relatively large M2M networks to function, the M2M devices typically need to operate in a low priority communication mode most of the time. Thus, the ability to switch from a low priority mode to a higher priority mode should only be done at rare occasions. To support this ability to switch communication priority modes, UEs, including M2M devices operable to provide machine type communication (MTC), can be configured to support multiple non-access stratum (NAS) signaling priority modes. A higher NAS signaling priority mode may be used after communication using a low priority NAS signaling priority mode has been attempted. However, communication in any priority order may be used in practice.

For example, if communication at the low priority mode is rejected by a network due, for instance, to network traffic congestion that delays the low priority communication, then the M2M device (i.e. UE) can be configured to attempt to send the communication again, with the second communication attempt using a higher priority communication mode, such as a normal priority NAS signaling priority mode. This allows the use of low priority communication to be optimized by attempting to communicate first with the low priority mode, while enabling the M2M device with the ability to communicate data with lower latency by switching to a higher NAS signaling priority mode, when necessary. In addition, a single device, such as an M2M device, may have multiple applications. Some applications may be configured to communicate using a low priority NAS signaling priority mode, while other applications may be configured to communicate using a higher priority NAS signaling priority mode. Attempted communication by the applications having a low priority may be rejected, while communication by the applications having a higher priority may be accepted by the network. In addition, the priority of an application may also change. The ability to communicate with multiple priorities can provide additional efficiencies in a wireless network.

FIG. 1 illustrates an example of one type of wireless network 100 operable to communicate with M2M devices. In this example, a 3GPP LTE radio access network (RAN) system is illustrated. The system operates based on the 3GPP LTE specification, such as releases 8, 9 10, and 11. While this example is provided, it is not intended to be limiting. Other wireless networks, such as the Institute of Electrical and Electronics Engineers (IEEE) 802.16 standard, commonly referred to as WiMAX, and the IEEE 802.11 standards, commonly referred to as Wi-Fi, may also be configured to communicate with M2M devices. The set of standards includes the IEEE 802.11a standard released in 1999 for communication in the 5 GHz and 3.7 GHz band, the IEEE 802.11b standard, also released in 1999 for communication in the 2.4 GHz band, the 802.11g standard released in 2003 for communication in the 2.4 GHz range via orthogonal frequency division multiplexing (OFDM) and/or direct sequence spread spectrum (DSSS), and the 802.11n standard released in 2009 for communication in the 2.4 GHz and 5 GHz bands using multiple-input multiple-output (MIMO).

Standards such as WiFi or Bluetooth are used to provide wireless local area networks (WLAN) that can be accessed by dual priority devices that are also capable of accessing a cellular networking standard such as WiMAX (worldwide interoperability for microwave access), and 3GPP. Releases of the IEEE 802.16 standard include the IEEE 802.16e-2005, 802.16-2009, and 802.16m-2011. Releases of the 3GPP standard include the 3GPP LTE, Release 8 in the fourth quarter of 2008 and 3GPP LTE Advanced Release 10 in the first quarter of 2011.

The wireless network 100 illustrated in FIG. 1 is comprised of a RAN 110 and an evolved packet core (EPC) 160. For 3GPP LTE, the RAN 110 illustrated in FIG. 1 can include transmission nodes such as the evolved universal terrestrial radio access (E-UTRAN or eUTRAN) or UTRAN modules, represented as the eNodeBs 112A and 112B. The RAN can be in communication with an evolved packet core (EPC) module. The EPC can include a serving gateway (S-GW) and a mobility management entity (MME) 130. The EPC can also include a packet data network (PDN) gateway (P-GW) 142 to couple the S-GW to a PDN, such as the Internet 180, an intra-net, or other similar network. The S-GW can provide internet network access and standard network access for the mobile devices associated with the RAN. The S-GW and MME can be in direct communication with each other via cabling, wire, optical fiber, and/or transmission hardware, such a router or repeater. The eNodeBs 112A-B can be connected to user equipment, such as the wireless M2M devices 150A-B via an LTE radio link 115 A-B, respectively. A backhaul link 114, such as an X2 link, can be used to connect the eNBs. The X2 link is typically formed over a broadband wired or optical connection between the eNBs. Connections between the eNBs 112A-B, the S-GW 120, and the MME 130 can be made via S1 type connections 124A-B, and 126A-B. The S1 interface is described in 3GPP Technical Specification (TS) 36.410 versions 8 (2008-12-11), 9 (2009-12-10) and 10 (2011-03-23), which are available to the public.

The EPC 160 can also include a policy and charging rules function (PCRF) node 144 that can be used to determine, in near real time, policy rules in the wireless network. The PCRF node can access subscriber databases and other specialized functions, such as charging systems, as can be appreciated.

While FIG. 1 generally depicts the M2M devices 150 A-B as a mobile device (e.g., a cellular phone), in various embodiments the M2M devices 150 A-B may be a sensor in communication with a 3GPP LTE transceiver, a personal computer (PC), a notebook, an ultrabook, a netbook, a smartphone, an ultra-mobile PC (UMPC), a handheld mobile device, an universal integrated circuit card (U ICC), a personal digital assistant (PDA), a Customer Premise Equipment (CPE), a tablet, or other consumer electronics such as MP3 players, digital cameras, and the like. In the present disclosure, the terms Mobile Station (MS), "UE", "device", and "M2M device" will be used interchangeably for simplicity purposes. The eNBs 112A-B may include one or more antennas, one or more radio modules to modulate and/or demodulate signals transmitted or received on an air interface, and one or more digital modules to process signals transmitted and received on the air interface. The eNBs may be a relatively high power node, referred to as a "macro node" or a relatively low power node (LPN). An LPN can include a micro node, pico node, home eNB (HeNB), remote radio head (RRM), remote radio entity (RRE), and the like.

Embodiments of the present invention provide applications that may reside on an M2M device with the ability to override the device's default "low priority" setting in cases when the applications may need to transmit a "normal priority" communication via the EPC 160. A network controller, such as an MME can be configured to receive communications from dual priority UE and change a packet data network based on messages received from the UE.

In one embodiment, the UE and/or communications initiated by the UE (e.g., requests initiated by the applications hosted by the UE) may be assigned a default (e.g., low) priority level. In some cases, for example, in emergency and other situations described below in greater detail, the UE may be configured to override the default priority associated with the initiated request and assign a higher (e.g., "normal") priority level to the initiated request that may be treated by the network according to the assigned priority level. For example, the network may be congested and may not immediately accept a request or other communication from the UE that is associated with a default priority (or lower level of priority), but may accept and process a request or other communications from the UE that are associated with a higher (i.e. normal) priority level that may be assigned to the communication by the UE. More specifically, if the network is determined to be congested and therefore unable to process a request with a default (low) priority from the UE, the network may provide to the UE a wait time value, during which the UE may refrain from attempting to contact the network with communications having a low priority. However, if the UE initiates requests with a higher (normal) priority level, these requests may be accepted by the network. However, it should be noted that under certain conditions the network may be so congested that even the higher priority requests can be rejected. If this occurs, the UE may be configured to provide a third, fourth, fifth, or even higher priority level. The actual number of priority levels that may be used can be determined by system needs and design.

In another embodiment, it may be desired for the UE to have a capability to override access control configurations associated with the UE, such as Extended Access Barring configuration. Extended Access Barring (EAB) is a mechanism for the operator(s) to control mobile originating access attempts from UEs that are configured for EAB in order to prevent overload of the access network and/or the core network. In congestion or overload situations, the operator may restrict access from UEs configured for EAB while permitting access from other UEs. UEs configured for EAB are considered more tolerant to access restrictions than other UEs. When an operator determines that it is appropriate to apply EAB, the network broadcasts necessary information to provide EAB control for UEs of a specific type or located in a specific area.

However, in some instances, the Extended Access Barring configuration may need to be overridden, typically in conjunction with a dual priority override capability as described above. Typically, UEs that are configured for low access priority are also configured for EAB. Accordingly, when it is desired to override a low priority for a communication initiated by a UE, it may also be desirable to override an EAB setting in order to allow the communication to proceed.

Figure 2:
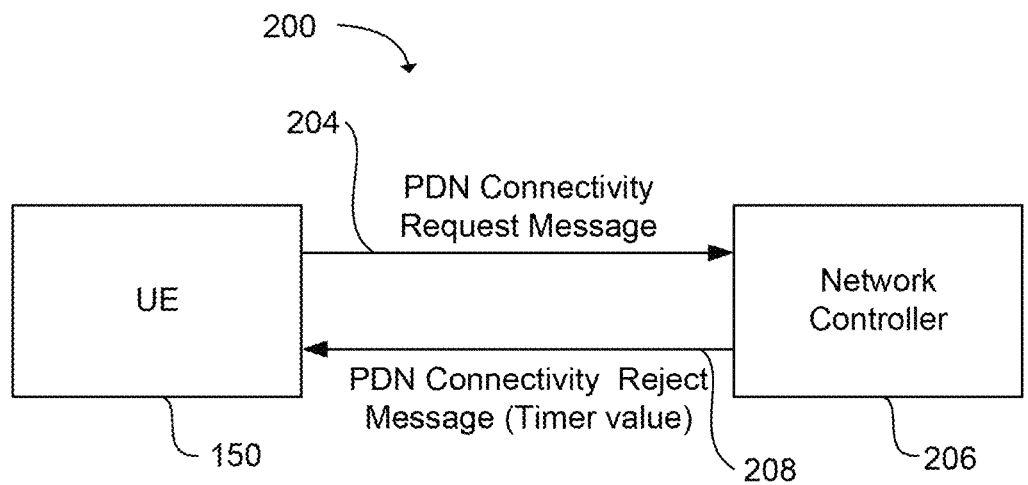
FIG. 2 illustrates a block diagram of a flow diagram between a user equipment (UE) and a network controller in accordance with an embodiment of the present invention.

An example connection diagram between the UE 150 and the network 100 (FIG. 1) is illustrated in FIG. 2. As the diagram 200 illustrates, the UE may send packet data network (PDN) connectivity request message 204 to a network controller 206. In one embodiment, the network controller may be an MME. However, other types of servers may also be configured to act as a network controller, including the S-GW, P-GW, and PCRF.

The PDN connectivity request message 204 may be a request by a UE 150 A or B to establish a PDN connection with a packet data network to allow the UE 150 to exchange data with a PDN, such as the internet. The network controller 206 may control the establishment of and/or the maintenance of PDN connections between the UE 150 A or B and the EPC 160. The network controller 206 may be disposed in the EPC 160 with which the UE 150 A or B attempts to establish a PDN connection. This will be discussed more fully in the proceeding paragraphs.

If the RAN 110 or the EPC 160 is congested and is not able to support a new PDN connection associated with the PDN connectivity request message 204, the network controller 206 may respond with a PDN connectivity reject message 208 to reject the PDN connectivity request message 204. In this case a PDN connection between the UE 150 A or B and the RAN 110 may not be established. In one example, a PDN connectivity request message may be associated with a NAS request message, such as an attach request message, a tracking area update request message, or an extended service request message.

In some instances, for particular types of devices, such as MTC devices, the network controller 206 may provide, in the PDN connectivity reject message 208, a wait time (WT) value. The WT value is also known as an extended wait time. The WT value can be measured by an EWTA timer that is associated with the device, which is also known as a "back-off timer". The back-off timer associated with an evolved packet system (EPS) session management (ESM) is referred to by the 3GPP LTE specification as a timer T3396. The timer T3396 can be configured to start running for the duration of the wait time that is received from the network controller. The timer T3396 can keep the MTC device "on hold," e.g., refraining from sending communications to the network, until the wait time expires, at which time the MTC device may be allowed to resend the request to the network. This will be discussed more fully in the proceeding paragraphs.

With a dual mode UE, such as an MTC device, rather than waiting for the timer T3396 value to expire, the dual mode MTC device can be configured to send a second connection request message even when the timer T3396 is running. The second connection request message can be sent only with a higher (i.e. normal or higher) priority level. The network controller 206 may then allow the connection request with the higher priority level, thereby enabling the MTC device to more quickly communicate in certain situations, as discussed in the preceding paragraphs. However, both the UE and the network need to be configured to allow a second PDN connectivity request with a different NAS signaling priority mode to be accepted and to deal appropriately with the timers that may be running.

In the proceeding paragraphs, more specific examples will be provided to illustrate how a UE 150 A or B having dual NAS signaling priority modes may be configured to operate when a network 100 is congested and a UE receives a wait time value from the network in response to a connectivity request or a change in bearer request.

Before a UE can communicate with a network, such as the network 100 illustrated in FIG. 1, the UE initiates an attach procedure by the transmission, to the eNodeB, of a Non-Access Stratum (NAS) Attach Request message. The eNodeB communicates the message to a network controller, such as the MME. A variety of information can be communicated in the Attach Request message, as outlined in the 3GPP LTE specifications, including Rel. 8, 9, 10. If the UE has valid security parameters, the Attach Request message is integrity protected by the NAS Medium Access Control (MAC) to allow validation of the UE by the MME. If the UE does not have a valid EPS security association, then the Attach Request message is not integrity protected.

PDN Connectivity

A brief review of PDN connectivity is provided as background. A PDN connectivity request is a procedure used in 3GPP LTE to enable a UE to request the setup of a default EPS bearer to a packet data network. The UE can request connectivity to a PDN by sending a PDN CONNECTIVITY REQUEST message to a network controller, such as an MME. If this request is accepted by the network, then the network controller initiates the establishment of a default EPS bearer context activation procedure. This procedure can be used to establish a first default bearer, in which case a PDN connectivity request is sent along with an initial attach message. Alternatively, a subsequent default bearer can be established to add additional PDNs, in which case a PDN connectivity request is sent by the UE to the network controller, without the need for an initial attach message.

When requesting connectivity to an additional PDN, the UE can include the requested Access Point Name (APN). An APN is the name of a gateway between a mobile network and another computer network, such as the public internet. A mobile device making a data connection can be configured with an APN to present to a carrier. The carrier will then examine this identifier to determine what type of network connection should be created. The APN can identify the PDN that a mobile data user wants to communicate with.

Session Management (SM) can be used in conjunction with a back-off timer at the UE to manage congestion issues in the network. SM can be used in the establishment of PDN connectivity and allocating an additional bearer or modifying aspects of an existing bearer. The SM signaling can be initiated by EPS session Management (ESM) requests from the UE during PDN connectivity requests, bearer resource allocation, or bearer resource modification requests.

The UE can set an ESM information transfer flag in the PDN connectivity request message to indicate that it has ESM information, such as protocol configuration options, APN configuration options, or both, that can be transferred to the MME after the NAS signaling security has been activated. If the UE includes the ESM information transfer flag in the PDN connectivity request message, the MME is configured to wait for completion of the ESM information request procedure before proceeding with the PDN connectivity procedure. The MME can then check if connectivity with the requested PDN can be established.

When using ESM to provide congestion control in a wireless network, the MME may reject the ESM requests from the UE with a certain back-off time when ESM congestion associated with a particular APN is detected. The MME may store an SM back-off time when congestion control is active for an APN. The MME may immediately reject any subsequent request from the UE that is directed to the APN before the stored SM back-off timer is expired. In addition, the UE typically does not attempt to send a request when it has been asked to back-off.

The SM back-off timer (or time value) can be transmitted from the MME to the UE when the network controller (e.g. MME) rejects the ESM requests. Upon reception of the SM back-off time value in the ESM reject message, the UE can activate an SM back-off timer that is set based on the received SM back-off time value from the MME. The T3396 timer can be used at the UE to apply the back-off time provided by the MME. During this time period, the UE typically may not initiate any SM procedures for the congested APN, such as a PDN connectivity request, a bearer resource modification request, or a bearer resource allocation request. The UE can provide a separate SM back-off timer, such as the T3396 timer, for each APN that the UE may activate or decide to connect to.

The PDN connectivity request can include a number of different information elements (IEs), as outlined in the 3GPP LTE specifications Rel. 8, 9, and 10. The IEs can include a Request Type IE, an EPS Bearer Identity IE, a Procedure Transaction Identity IE, a PDN Type IE, and a Device Properties IE. Additional IEs may also be included, as outlined in the specifications.

Dual Priority UEs

When a UE is configured for dual NAS signaling priority capability, the UE typically uses the Device Properties IE to indicate a Low Priority NAS signaling priority mode in applicable NAS Request messages. A message without a low priority indication in the device properties IE or without the device properties IE is typically treated as a normal priority request by the network.

At the PDN connectivity request setup, it is indicated in the Charging Data Record (CDR) if a low priority indicator was included in the request from the UE. In the 3GPP LTE specification Rel. 8, 9 and 10, the priority setting in the charging system is not updated for the lifetime of the PDN connection. There is no policing in the network that priority used in the messages actually correlates to the priority used when the PDN connection was set up. Reconfiguration of a low priority setting for a PDN connection in a UE has been considered to be an infrequent action. Reconfiguration of the low priority setting has not been configured to trigger changes in the PDN connection, such as deactivation or reactivation to update the charging system with the changed configurations. This has made it difficult for a UE to change from a low priority NAS signaling mode, to a higher priority mode, such as a normal priority NAS signaling mode.

In order to encourage the use of a low priority NAS signaling priority mode in devices configured for relatively infrequent, high latency communication, such as MTC devices, it can be important to configure the MTC device and the wireless network with which it communicates to allow a low priority setting to be changed to provide a lower latency communication when such a change is desired, as previously discussed.

In accordance with one embodiment of the present invention, a UE can be configured to provide the following solutions for handling PDN connections in a dual priority system: (1) a UE that deactivates the PDN connection and re-establishes a new PDN connection; (2) a UE that establishes multiple PDN connections with different priorities using different APNs; and (3) a UE that establishes multiple PDN connections with different priorities using the same APN.

Accordingly, when a UE attempts to establish a PDN connection with a low priority NAS signaling priority mode set, and the PDN connectivity request is rejected due to congestion in the network, the T3396 timer is activated based on a time value received in the PDN connection reject message. The UE typically cannot attempt to connect with the network again until the T3396 timer has expired. However, a dual priority UE, such as a dual priority MTC device, can send a second PDN connection request having a greater NAS signaling priority mode, such as a normal priority NAS signaling priority mode.

In one embodiment of the present invention, an existing PDN connection with the MME for a selected APN and PDN type, which operates in a first NAS signaling priority mode, can be deactivated. A new PDN connection, with a same APN and PDN type can then be established with a second NAS signaling priority mode.

If the new PDN connection request with the same APN and PDN type is received at the MME prior to deactivation of the existing PDN connection, then a PDN connectivity reject message may be sent from the MME to the UE, identifying that multiple PDN connections for a given APN are not allowed. Therefore, the first PDN connection can first be deactivated.

However, the deactivation of a single PDN connection between a UE and a network controller, followed by the activation of a new PDN connection can be time consuming and use an undesired amount of network resources. To reduce the amount of time and use of network resources, the MME can be configured to deactivate existing EPS bearer contexts for the existing PDN connection without notification to the UE and proceed with the requested PDN connectivity procedure with the second NAS signaling priority mode, such as a normal NAS signaling priority mode.

To ensure that the network (i.e. the MME) will not reject the requested PDN connectivity procedure for an already existing PDN connection, a procedure for identifying a change in the NAS signaling priority mode can be provided. For example, in one embodiment, the PDN connectivity request sent from the UE to the MME can be configured to identify a NAS signaling priority mode for the PDN connection request. When the NAS signaling priority mode differs from the existing PDN connection, the MME can be configured to deactivate the existing EPS bearer contexts for the existing PDN connection locally without notification to the UE and proceed with the requested PDN connectivity procedure.

In one embodiment, the NAS signaling priority mode can be included in a Device Properties IE that is communicated in the PDN connectivity request message. One example of a device properties IE is illustrated in FIGS. 3a and 3b. This example is not intended to be limiting. The information illustrated may be communicated in a number of ways, as can be appreciated.

FIG. 3a illustrates octet 1 of a device properties information element. The device properties information element is a type 1 information element. The purpose of the device properties information element is to indicate if a UE is configured for NAS signaling low priority. The network can use the device properties information element for network congestion handling and for charging purposes. Different charging codes can be assigned based on the NAS signaling priority mode that is used. In one embodiment, the charging codes can be communicated to the PCRF 144 (FIG. 1). Alternatively, the charging codes may be tracked using the MME or another network controller.

The device properties information element illustrated in FIG. 3a includes a low priority bit (bit 1 in this example) and a priority override bit (bit 2 in this example). As shown in the table of FIG. 3b, the low priority bit can be set to zero or one. In this example a setting of zero for bit 1 indicates that the mobile station (MS) (i.e. UE) is not configured for NAS signaling low priority. In this case, NAS signaling normal priority is typically used. When bit 1 is set to one, it indicates that the MS is configured for NAS signaling low priority.

As shown in the example illustration in the table displayed in FIG. 3b, bit 2 of the device properties IE can be set to a value of one to override the low priority setting of bit 1 with a normal priority. Bit 2 can typically be set to a value of zero to allow a UE, such as an MTC device that infrequently communicates with high latency, to communicate with a NAS signaling low priority. In selected situations, as previously discussed, when it is desired to communicate with a higher NAS signaling priority, such as a NAS signaling normal priority, the value of Bit 2 can be changed to 1.

When Bit 2 of the device properties IE is changed to one, this information can be communicated to the network in the PDN connectivity request message to identify a change in the NAS signaling priority mode. The MME can determine, based on the information provided by Bit 2, in this example, that the NAS signaling priority mode differs from the existing PDN connection. The MME can be configured to deactivate the existing EPS bearer contexts for the existing PDN connection locally without notification to the UE and proceed with the requested PDN connectivity procedure.

While several examples have been provided for a dual priority NAS signaling, this is not intended to be limiting. It is possible to have any number of priorities. For example, bits 1, 3 and 4 of the device properties IE may also be used to indicate a priority. In this example, eight different priority levels can be indicated in the device properties IE. A larger number of priority levels can enable a traffic load on a wireless network to be more efficiently managed by providing rapid access to devices with the highest priority, and allowing devices with the lowest priority to communicate when there is a relatively low traffic load. The greater number of priority levels can also allow low priority devices to use the network at a relatively low cost, since the devices may only be allowed to use the network during low use, low traffic periods.

In another embodiment, a PDN connectivity request message can be communicated, from the UE to the MME, with a different APN, to establish the new PDN connection with the MME. This allows the UE to change the NAS signaling priority mode by establishing PDN connections with different NAS signaling priorities using different APNs. The ability to switch to a PDN connection with a different NAS signaling priority that is using a different APN can also be used to reduce the signaling load on the network and can be accomplished in less time than the establishment of a new PDN connection.

In both cases, the new PDN connection can have a second NAS signaling priority mode that is greater than the first NAS signaling priority mode. For example, the first NAS signaling priority mode may be a low priority, and the second NAS signaling priority mode may be a normal priority. The increased NAS signaling priority mode can allow the UE to communicate with a lower latency relative to a PDN with a lower NAS signaling priority mode when the network has a traffic load greater than a selected threshold. The actual amount of traffic can depend on the capabilities of the network.

When a PDN connectivity request for a selected PDN is sent to a network, and a determination is made that the requested PDN cannot be accepted by the network, the MME can be configured to send a PDN connectivity reject message to the UE. The message can include an ESM cause value indicating the reason for rejecting the requested PDN connectivity. For example, 3GPP Technical Specification (TS) 24.301 V. 11.0.0 (2011-09) Section 6.5.1.4 discloses a number of different ESM cause codes that can be sent in an ESM cause IE in the PDN connectivity reject message to the UE. If the ESM cause value is #26 "insufficient resources", the network can include a value for timer T3396 to allow the UE to back-off from additional PDN connectivity requests, as previously discussed. The value for timer T3396 can be sent in a timer T3396 IE.

A first PDN connectivity request may be sent with a low priority indicator, with a PDN connectivity reject message sent from the MME to the UE with cause value #26 and a value for timer T3396. A dual priority UE may then send a second PDN connectivity request with a higher priority indicator, such as a normal priority. If a PDN connectivity reject message is sent for the second attempt with the higher priority indicator with cause value #26, then an updated value for the timer T3396 will be received. If the PDN connectivity request message was sent standalone, the UE can be configured to stop timer T3396 if it is running. The UE can then start the timer T3396 and not send another PDN connectivity request message for the same APN until the timer T3396 expires, the timer T3396 is stopped, the UE is switched off, or the Universal Subscriber Identity Module (USIM) is removed.

In another embodiment, if the PDN connectivity request message was sent together with an attach request message, and a PDN connectivity reject message is sent from the MME to the UE with a cause value #26 and a value for timer T3396 in the T3396 value IE, a response from the UE can depend on whether an attach reject message is integrity protected. If the UE has valid security parameters, the attach reject message is considered to be integrity protected by the NAS-MAC, which allows validation of the UE by the MME. If the UE does not have a valid EPS security association, then the attach reject message is not integrity protected.

When the attach reject message is integrity protected, the UE can respond to the PDN connectivity reject message with the cause value #26 by stopping timer T3396, if it is running. If the timer value indicates neither zero nor deactivated, the UE can then start timer T3396 with the value provided in the T3396 value IE in the PDN connectivity reject message. Since the value on the running T3396 timer was determined by a previous rejection, which may be based on a rejection due to a low priority indicator, resetting the timer to the value received in the timer T3396 value IE sent in the current rejection allows the timer T3396 value to more accurately represent the current status of the wireless network. If the network has become more congested from the first rejection to the second rejection, then the timer T3396 value may increase. Conversely, if the network has become less congested from the first rejection to the second rejection, then the timer T3396 value may decrease. In addition, the timer T3396 value may be set differently depending on the NAS signaling priority mode. The actual timer T3396 value can depend on a number of factors, such as the extent of network congestion, the load on the network, the number of UEs that are connected to the network, and other factors described within the 3GPP LTE specification. By resetting the timer T3396 value IE, the back-off time on the timer can more accurately represent the current status of the wireless network.

When the attach reject message is not integrity protected, the UE can respond to the PDN connectivity reject message with the cause value #26 by stopping timer T3396, if it is running. The UE can then start timer T3396 with a random value from a default range. The default range can be specified by the 3GPP LTE specification. For example, the default range may be specified in table 11.2.3 defined in 3GPP TS 24.008 V11.0.0 (2011-09-28).

The timer T3396 can be similarly operated in response to other reject messages sent from the MME to the UE when an ESM cause code indicates insufficient resources in the network (i.e. ESM cause value #26). For example, when a bearer resource allocation reject message is sent from the MME to the UE, the message can contain an ESM cause value #26 indicating insufficient resources. The network controller, such as the MME, can include a value in the timer T3396 value IE in the bearer resource allocation reject message. If the ESM cause value is #26 "insufficient resources" and the T3396 value IE is included, and if the T3396 timer is running and indicates neither zero nor deactivated, the UE can stop timer T3396. The UE can then start timer T3396 with the value provided in the T3396 value IE and try not to send another PDN connectivity request, bearer resource modification request, or bearer resource allocation request message for the same APN until timer T3396 expires, timer T3396 is stopped, the UE is switched off, or the USIM is removed from the UE.

In another example, when a bearer resource modification reject message is sent from the MME to the UE, the message can contain an ESM cause value #26 indicating insufficient resources. The network controller, such as the MME, can include a value in the timer T3396 value IE in the bearer resource modification reject message. If the ESM cause value is #26 "insufficient resources" and the T3396 value IE is included, and if the T3396 timer is running and indicates neither zero nor deactivated, the UE can stop timer T3396. The UE can then start T3396 with the value provided in the T3396 value IE and try not to send another PDN connectivity request, bearer resource modification request, or bearer resource allocation request message for the same APN until timer T3396 expires, timer T3396 is stopped, the UE is switched off, or the USIM is removed from the UE.

Returning to FIGS. 3a and 3b, the device properties IE can be included in a PDN connectivity request message for a dual priority UE that can be configured for a NAS signaling low priority mode. When a bearer resource modification request or a bearer resource allocation request message is rejected with an ESM cause value #26 indicating insufficient resources, and a timer T3396 value, a dual-priority UE can send a PDN connectivity request message to the same APN while timer T3396 is running. For example, a PDN connectivity request message can be sent to a same APN as a previous PDN connectivity request message with bit 2 of octet 1 in the device properties IE set to a value of one to override the previous low priority setting of bit 1 with a normal priority. The network controller, such as the MME, can be configured to receive this message and respond to it even while the timer T3396 is running. Depending on the traffic conditions in the network, in response to the PDN connectivity request message, the MME may send a device connectivity accept message to the UE, or a device connectivity rejection message with a specific ESM code, as previously discussed.

In another embodiment, a PDN connectivity rejection message can include an ESM cause value #27 indicating "missing or unknown APN". When the cause value #27 is received, the dual priority UE can be configured to not send a PDN connectivity request message to the same APN as a previous PDN connectivity request message, since the APN is not known by the network controller.

In summary, if timer T3396 is running for a specific APN, because a PDN connectivity request, bearer resource modification request, or bearer resource allocation request message containing the low priority indicator set to "MS is configured for NAS signaling low priority" was rejected with timer T3396 and ESM cause value #26 "insufficient resources", upon request of the upper layers, the UE can: send a PDN connectivity request message to the same APN, with a low priority indicator set to "MS is not configured for NAS signaling low priority"; or if a PDN connection established with the low priority indicator set to "MS is not configured for NAS signaling low priority exists", send a bearer resource modification request message or a bearer resource allocation request message for the PDN connection, with a low priority indicator set to "MS is not configured for NAS signaling low priority". By sending a bearer resource modification request or bearer resource allocation request with bit 2 of octet 1 in the device properties IE set to a value of one to override the previous low priority setting of bit 1 with a normal priority, the existing PDN connection can be modified to a normal priority. This allows the UE to establish multiple PDN connections with different priorities using the same APN.

Figure 4:
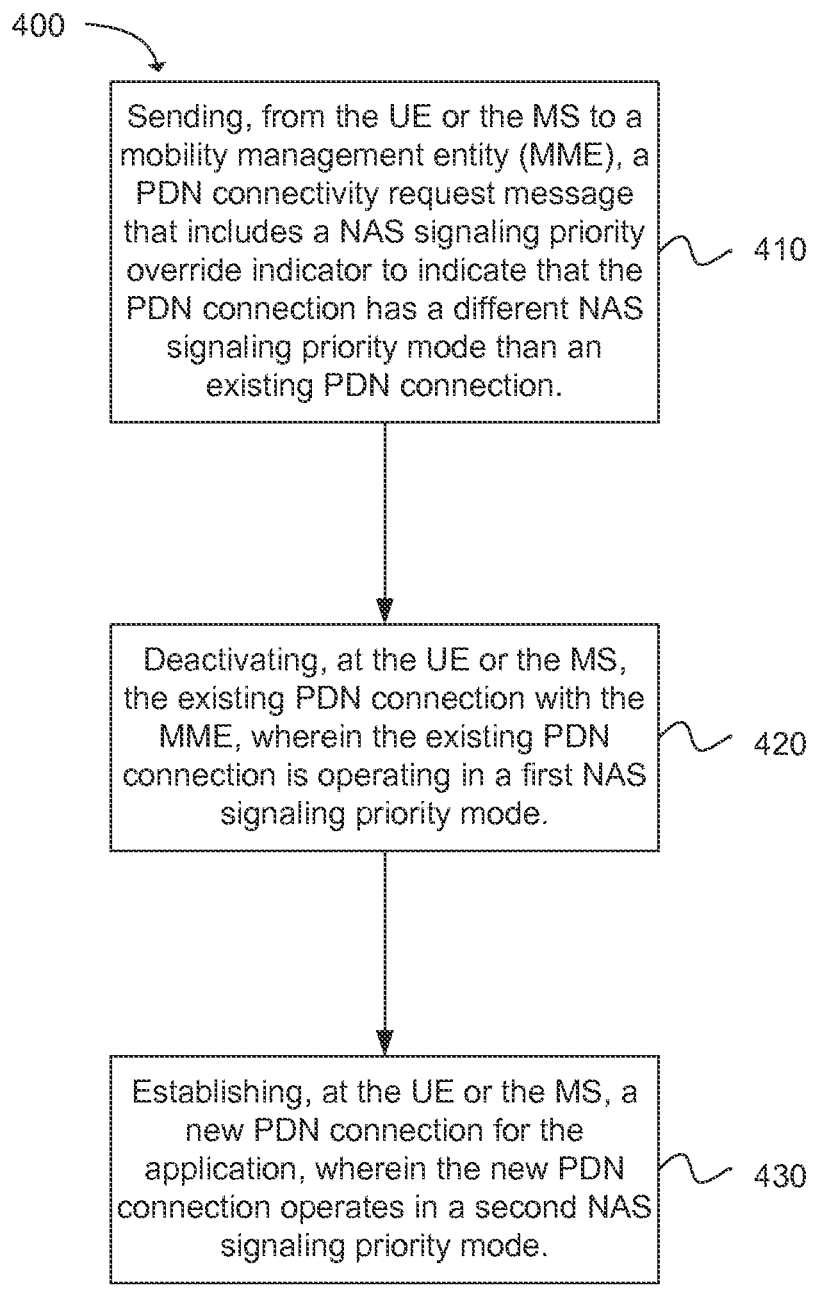
FIG. 4 depicts a flow chart of a method for forming a packet data network (PDN) connection at a dual access priority mode configured user equipment (UE) in accordance with an embodiment of the present invention.

In another embodiment, a method 400 for forming a packet data network (PDN) connection at a multi-access priority mode configured user equipment (UE) or mobile station (MS) is disclosed, as depicted in the flow chart of FIG. 4. The method includes the operation of sending, from the UE or the MS to a mobility management entity (MME), a PDN connectivity request message that includes a NAS signaling priority override indicator to indicate that the PDN connection has a different NAS signaling priority mode than an existing PDN connection, as shown in block 410. The method further includes deactivating, at the UE or the MS, the existing PDN connection with the MME, wherein the existing PDN connection is operating in a first NAS signaling priority mode, as shown in block 420. An additional operation includes establishing, at the UE or the MS, a new PDN connection for the application, wherein the new PDN connection operates in a second NAS signaling priority mode, as shown in block 430.

In one embodiment, the operation of sending the PDN connectivity request can further comprise sending the PDN connectivity request message, from the UE or the MS, with a same Access Point Name (APN) and PDN type as the existing PDN connection; and sending the NAS signaling priority override indicator in a device properties information element (IE).

Sending the PDN connectivity request can also include sending the NAS signaling priority override indicator to indicate one of "low priority is not overridden"; and "low priority is overridden with normal priority". Sending the PDN connectivity request can further comprise sending the device properties IE with a low priority indicator to indicate one of: the UE or the MS is not configured for NAS signaling low priority; and the UE or the MS is configured for NAS signaling low priority.

While the PDN connectivity request may include a dual priority, such as a low priority and a normal priority, it is also possible to include additional priority levels. In one embodiment, the operation of sending the PDN connectivity request can further comprise sending the device properties IE with a priority indicator to indicate one of a plurality of NAS signaling indicator levels.

The operation of establishing the new PDN connection can further comprise deactivating evolved packet system (EPS) bearer contexts at the MME for the existing PDN connection without sending a notification to the UE or the MS to reduce network overhead in establishing the PDN connection with the different NAS signaling priority mode. Establishing the new PDN connection can also include receiving, at the UE or the MS, a PDN connectivity reject message that multiple PDN connections for a given APN are not allowed. In one embodiment, the method 400 can further comprise sending a PDN connectivity request message, from the UE or the MS, with the same APN after deactivating the existing PDN connection, to establish the new PDN connection with the MME for the application. The method can also comprise sending a PDN connectivity request message, from the UE or the MS, with a different APN, to establish the new PDN connection with the MME for the application.

Figure 5:
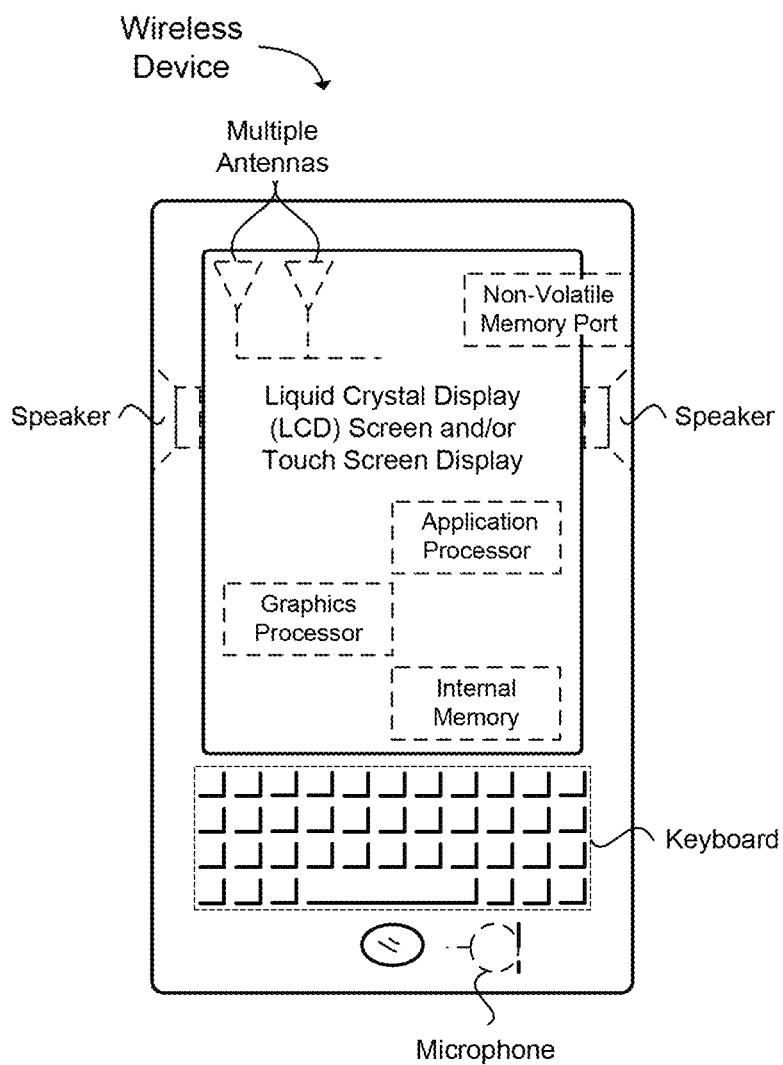
FIG. 5 illustrates a diagram of a wireless device (e.g., MS or UE) in accordance with an example.

FIG. 5 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with a node, macro node, low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 5 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

In one embodiment, a mobile station (MS) or a user equipment (UE) is disclosed that is configured to having a dual-access non access stratum (NAS) signaling priority mode. The MS or the UE can include computer circuitry configured to send packet data network (PDN) connectivity request message, a bearer resource modification request message, or a bearer resource allocation request message to a specific Access Point Name (APN) with a low priority indicator set to a status that the MS or the UE is configured for NAS signaling low priority; receive a reject message with an evolved packet system (EPS) session management (ESM) cause value indicating a rejection due to insufficient resources and a timer T3396 value; and send a PDN connectivity request message to the specific APN with the low priority indicator set to a status that the MS or the UE is not configured for NAS signaling low priority.

The MS or the UE can have computer circuitry that is further configured to determine that a PDN connection exists that is established with the low priority indicator set to a status that the MS or the UE is not configured for NAS signaling low priority; and send a bearer resource modification request message for the PDF connection with the low priority indicator set to a status that the MS or the UE is not configured for NAS signaling low priority.

The MS or the UE can have computer circuitry that is further configured to determine that a PDN connection exists that is established with the low priority indicator set to a status that the MS or the UE is not configured for NAS signaling low priority; and send a bearer resource allocation request message for the PDF connection with the low priority indicator set to a status that the MS or the UE is not configured for NAS signaling low priority.

The MS or the UE can have computer circuitry that is further configured to establish multiple PDN connections with different NAS signaling priorities using the specific APN.

The MS or the UE can include an antenna, a touch sensitive display screen, a speaker, a microphone, a graphics processor, an application processor, internal memory, or a non-volatile memory port.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A mobile station (MS) or user equipment (UE) having a dual access non access stratum (NAS) signaling priority mode, having one or more processors configured to:
    send a packet data network (PDN) connectivity request message, a bearer resource modification request message, or a bearer resource allocation request message to a specific Access Point Name (APN) with a low priority indicator set to a status that the MS or UE is configured for NAS signaling low priority;
    receive a reject message with an evolved packet system (EPS) session management (ESM) cause value indicating a rejection due to insufficient resources; and
    send a PDN connectivity request message to the specific APN with the low priority indicator set to a status that the MS or UE is not configured for NAS signaling low priority,
    wherein the PDN connectivity request message includes a device properties information element (IE) to indicate the dual access NAS signaling priority mode of the MS or UE.

2. The MS or UE of claim 1, wherein the one or more processors are further configured to:
   determine that a PDN connection exists that is established with the low priority indicator set to a status that the MS or UE is not configured for NAS signaling low priority; and
   send a bearer resource modification request message for the PDN connection with the low priority indicator set to a status that the MS or UE is not configured for NAS signaling low priority.

3. The MS or UE of claim 1, wherein the one or more processors are further configured to:
   determine that a PDN connection exists that is established with the low priority indicator set to a status that the MS or UE is not configured for NAS signaling low priority; and
   send a bearer resource allocation request message for the PDF connection with the low priority indicator set to a status that the MS or UE is not configured for NAS signaling low priority.

4. The MS or UE of claim 1, wherein the one or more processors are further configured to establish multiple PDN connections with different NAS signaling priorities using the specific APN.

5. The MS or UE of claim 1, wherein the MS or UE includes an antenna, a touch sensitive display screen, a speaker, a microphone, a graphics processor, an application processor, internal memory, or a non-volatile memory port.

6. A method for forming a packet data network (PDN) connection at a multi-access priority mode configured user equipment (UE) or mobile station (MS), comprising:
   sending, from the UE or MS to a mobility management entity (MME), a PDN connectivity request message that includes a NAS signaling priority override indicator to indicate that the PDN connection has a different NAS signaling priority mode than an existing PDN connection, wherein the NAS signaling priority override indicator is sent in a device properties information element (IE);
   deactivating the existing PDN connection with the MME, wherein the existing PDN connection is operating in a first NAS signaling priority mode; and
   establishing, at the UE or MS, a new PDN connection for the application, wherein the new PDN connection operates in a second NAS signaling priority mode.

7. The method of claim 6, wherein sending the PDN connectivity request further comprises:
   sending the PDN connectivity request message, from the UE or MS, with a same Access Point Name (APN) and PDN type as the existing PDN connection.

8. The method of claim 7, further comprising sending a PDN connectivity request message, from the UE or MS, with the same APN after deactivating the existing PDN connection, to establish the new PDN connection with the MME for the application.

9. The method of claim 7, further comprising sending a PDN connectivity request message, from the UE or MS, with a different APN, to establish the new PDN connection with the MME for the application.

10. The method of claim 6, wherein sending the PDN connectivity request further comprises:
    sending the NAS signaling priority override indicator to indicate one of
    low priority is not overridden; and
    low priority is overridden with normal priority.

11. The method of claim 10, wherein the NAS signaling priority override indicator is sent in bit 2 of octet 1 of a device properties IE.

12. The method of claim 6, wherein sending the PDN connectivity request further comprises:
    sending a device properties IE with a low priority indicator to indicate one of:
    the UE or MS is not configured for NAS signaling low priority; and
    the UE or MS is configured for NAS signaling low priority.

13. The method of claim 12, wherein the NAS signaling priority indicator is sent in bit 1 of octet 1 of the device properties IE.

14. The method of claim 6, wherein sending the PDN connectivity request further comprises sending a device properties IE with a priority indicator to indicate one of a plurality of NAS signaling indicator levels.

15. The method of claim 6, wherein establishing the new PDN connection further comprises:
    deactivating evolved packet system (EPS) bearer contexts at the MME for the existing PDN connection without sending a notification to the UE or MS to reduce network overhead in establishing the PDN connection with the different NAS signaling priority mode.

16. The method of claim 6, wherein establishing the new PDN connection further comprises:
    receiving, at the UE or MS, a PDN connectivity reject message that multiple PDN connections for a given APN are not allowed.

17. A user equipment (UE) or mobile station (MS) having a dual access non-access stratum (NAS) signaling priority mode with one or more processors configured to:
    receive, from a mobility management entity (MME), a packet data network (PDN) connectivity reject message with an evolved packet system (EPS) session management (ESM) cause value indicating a rejection due to insufficient resources and a timer T3396 value in response to a PDN connectivity request message for one of a low priority NAS signaling priority mode and a normal priority NAS signaling priority mode;
    stop the timer T3396 when the timer T3396 is running;
    start the timer T3396 with a selected value; and
    send a PDN connectivity request message with a different NAS signaling priority mode to the MME after the timer T3396 has expired,
    wherein a device properties information element (IE) included in the PDN connectivity request message indicates one of the low priority NAS signaling priority mode or the normal priority NAS signaling priority mode.

18. The UE or MS of claim 17, wherein the one or more processors are further configured to:
    receive, at the UE or the MS, an attach reject message that is not integrity protected; and
    start the timer T3396 with a random value within a selected range.

19. The UE or MS of claim 17, wherein the one or more processors are further configured to:
    receive, at the UE or the MS, an attach reject message that is integrity protected;
    start the timer T3396 with the timer T3396 value provided in the PDN connectivity reject message.

20. The UE or MS of claim 17, wherein the one or more processors are further configured to start the timer T3396 with the timer T3396 value received from the MME, wherein the timer T3396 value is determined at the MME based on current traffic conditions.

21. The UE or MS of claim 17, wherein the one or more processors are further configured to:
   receive a bearer resource allocation reject message from the MME at the UE or the MS with an ESM cause value indicating a rejection due to insufficient resources and a timer T3396 value;
   start the timer T3396 with the value provided in a T3396 value information element (IE) in the bearer resource allocation reject message; and
   send the PDN connectivity request message, a bearer resource modification request message, or a bearer resource allocation request message after the timer T3396 expires or the timer T3396 is stopped.

22. The UE or MS of claim 17, wherein the one or more processors are further configured to:
   receive a bearer resource modification reject message from the MME at the UE or MS with an ESM cause value indicating a rejection due to insufficient resources and a timer T3396 value;
   start the timer T3396 with the value provided in a T3396 value information element (IE) in the bearer resource modification reject message; and
   send the PDN connectivity request message, a bearer resource modification request message, or a bearer resource allocation request message after the timer T3396 expires or the timer T3396 is stopped.

23. The UE or MS of claim 17, wherein the UE or MS is one of a mobile station (MS) and a machine to machine (M2M) device, and the UE or MS includes an antenna, a touch sensitive display screen, a speaker, a microphone, a graphics processor, an application processor, internal memory, or a non-volatile memory port.

24. The MS or UE of claim 1, wherein the one or more processors are further configured to receive the reject message with the evolved packet system (EPS) session management (ESM) cause value indicating the rejection due to insufficient resources and a timer T3396 value.

* * * * *